UNITED STATES PATENT OFFICE.

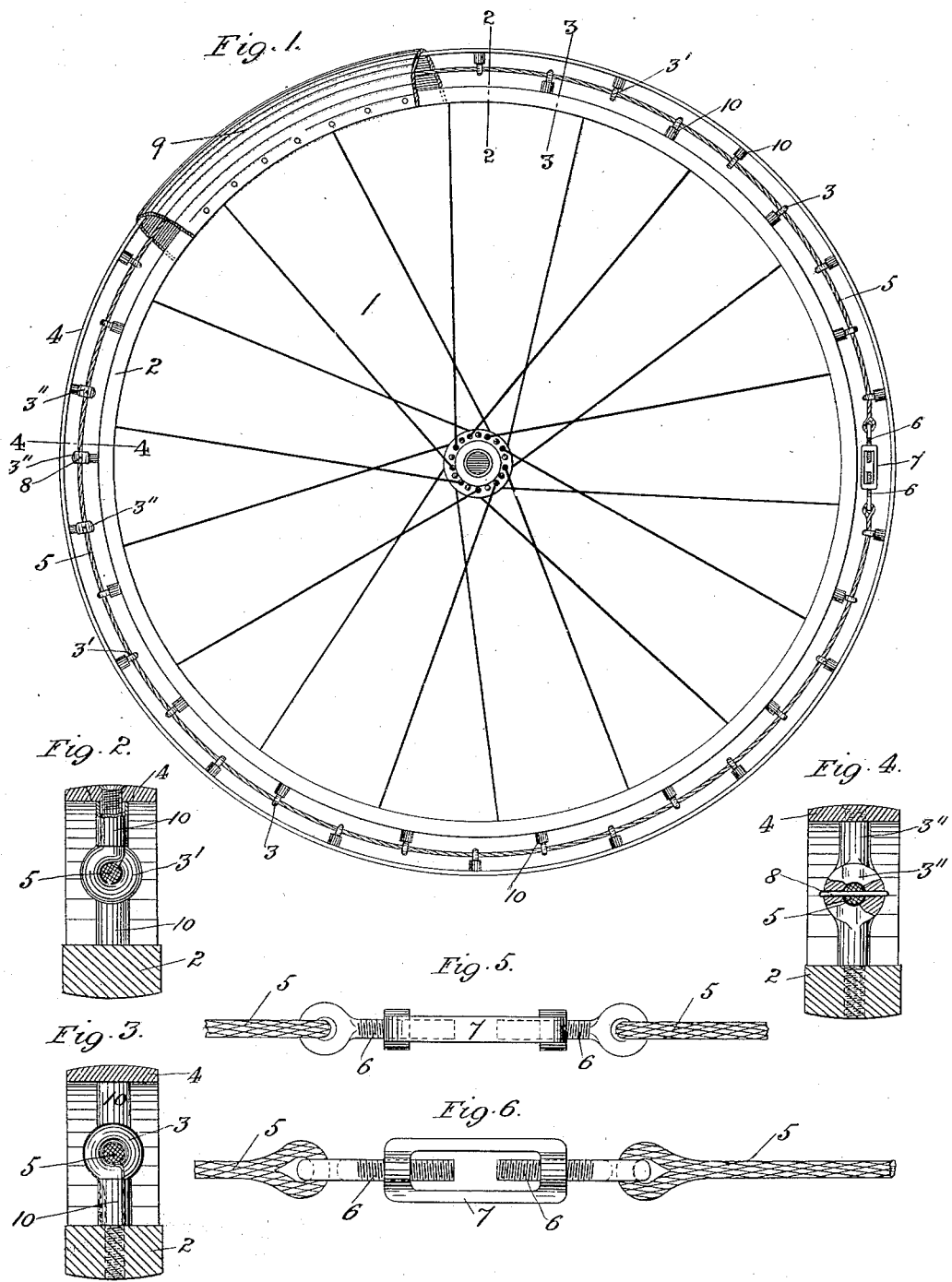

PAUL WEINHOLT, OF ST. LOUIS, MISSOURI.

WHEEL-TIRE.

SPECIFICATION forming part of Letters Patent No. 652,064, dated June 19, 1900.

Application filed April 19, 1900. Serial No. 13,475. (No model.)

*To all whom it may concern:*

Be it known that I, PAUL WEINHOLT, a citizen of the United States, residing at St. Louis, in the State of Missouri, have invented certain new and useful Improvements in Wheel-Tires, of which the following is a full, clear, and exact description, reference being had to the accompanying drawings, forming a part hereof.

My invention has relation to improvements in wheel-tires; and it consists in the novel arrangement and combination of parts more fully set forth in the specification and pointed out in the claims.

In the drawings, Figure 1 is a plan of a wheel, showing my tire applied thereto. Fig. 2 is a transverse section on line 2 2 of Fig. 1, taken through the two rims constituting the tire. Fig. 3 is a section on line 3 3 of Fig. 1. Fig. 4 is a similar section on line 4 4 of Fig. 1. Fig. 5 is an edge view of the turnbuckle at the meeting ends of the cable, and Fig. 6 is a side view thereof.

The object of my invention is to provide a bicycle or carriage wheel with a tire which will be perfectly elastic, taking the place of the prevailing pneumatic and solid rubber tires, but which shall possess a maximum amount of durability as compared with these destructible forms of that article.

In detail the invention may be described as follows:

Referring to the drawings, 1 represents an ordinary wheel, and 2 the felly or rim thereof. Distributed about the outer peripheral surface of the rim 2 and disposed radially thereon are a series of eyebolts 3. Surrounding the rim 2 is an outer tire or rim 4, having a series of inwardly-projecting and likewise radially-disposed eyebolts 3', the centers of the eyes of the two series of bolts 3 3' being disposed along the circumference of a common circle described between the rims 2 and 4. Passing through the eyes of the two series of bolts is a cable 5, whose free ends are provided with right and left hand screw-terminals 6 6, respectively, said terminals being adapted to be drawn together by a turnbuckle 7, thereby imparting the necessary tension to the cable.

To prevent the cable from slipping during either the tightening of the same by means of the turnbuckle or during the riding of the wheel, I provide two or three of the eyebolts 3'', which are located diametrically opposite the turnbuckle, with transverse pins 8, passing through the walls of the eyes and through the cable, respectively.

The rims 2 and 4 may be protected by an outer rubber or leather cover 9, folded over the outer rim and having its edges secured to the inner rim, the whole presenting the appearance of a pneumatic tire should this arrangement be desirable.

By the present construction the outer rim is spaced a suitable distance apart from the inner rim, being secured thereto at intervals by means of the intermediate cable and eyebolts, this arrangement resulting in an elastic outer rim or tire, being at the same time durable and as easy-riding as the prevailing forms of rubber tires. At the same time no amount of puncturing of the cover 9 can impair the utility of the wheel, and in the case of bicycles and carriages it makes an admirable substitute for the ordinary rubber tire. The outer rim is preferably made of steel, being in the form of a flat band slightly convexed outwardly, though the cross-section or size thereof is immaterial so far as the present invention is concerned. It is apparent, of course, that the details of construction herein set forth can be altered without departing from the spirit of my invention.

The stems of the several eyebolts are preferably covered by suitable sleeves or washers 10, this arrangement resulting in a more rigid connection between the parts, the ends of the washers at the same time preventing the spreading or opening of the eyes at the seams, the free ends of the rods or wires forming the eyes bearing against the washers, as best seen in Figs. 2 and 3.

Having described my invention, what I claim is—

1. A wheel-tire comprising an inner rim, an outer rim, eyebolts carried by the outer surface of the inner rim and inner surface of the outer rim respectively, the centers of the eyebolts being disposed along the circumference of a common circle, means for preventing the eyes of the bolts from spreading and a cable loosely passed through the eyes of the respective eyebolts, substantially as set forth.

2. A wheel-tire comprising an inner rim, an outer rim, eyebolts carried by the rims and located in the circular space between the rims, a cable passed through the eyes of the bolts, means for tightening or drawing the ends of the cable together, pins passed transversely through the eyebolts and cable at a point diametrically opposite the free ends of the cable, and washers passed over the stems of the eyebolts, for preventing the eyes of the bolts from spreading, substantially as set forth.

In testimony whereof I affix my signature in presence of two witnesses.

PAUL WEINHOLT.

Witnesses:
EMIL STAREK,
G. L. BELFRY.